(12) United States Patent
Cornet et al.

(10) Patent No.: US 6,722,807 B1
(45) Date of Patent: Apr. 20, 2004

(54) FRANGIBLE SLIDING FASTENING FOR FASTENING A PLASTICS MATERIAL PART ON A SUPPORT

(75) Inventors: Olivier Cornet, Bourg en Bresse (FR); Pascal Gustin, Oyonnax (FR)

(73) Assignee: Compagnie Plastic Omnium, Lyons (FR)

( * ) Notice: Subject to any disclaimer, the term of this patent is extended or adjusted under 35 U.S.C. 154(b) by 164 days.

(21) Appl. No.: 09/625,151

(22) Filed: Jul. 25, 2000

(30) Foreign Application Priority Data

Jul. 27, 1999 (FR) .............................................. 99 09725

(51) Int. Cl.$^7$ ............................................... F16M 11/20

(52) U.S. Cl. ............................ 403/2; 403/348; 403/353

(58) Field of Search ................................ 403/348, 350, 403/351, 2, 352, 353, 13, 14

(56) References Cited

U.S. PATENT DOCUMENTS 5,098,765 A   3/1992 Bien

*Primary Examiner*—John R. Cottingham
(74) *Attorney, Agent, or Firm*—Schweitzer Cornman Gross & Bondell LLP

(57) ABSTRACT

A sliding fastening for a plastics material part having at least one thin wall that is to be slidably fastened to a support via its thin wall, the part including in said thin wall an elongate opening having two longitudinal edges that are substantially parallel at least over a portion of their length, the fastening comprising a spacer that is separate from the part, that is thicker than the thickness of the thin wall, and that is suitable for sliding in the opening between the two longitudinal edges thereof, a cover completely covering the spacer, being larger than the opening so as to be incapable of passing through it in order to hold the thin wall in register with the thickness of the spacer, and a base for securing to the support. In the fastening the spacer and the base are united by frangible links.

13 Claims, 7 Drawing Sheets

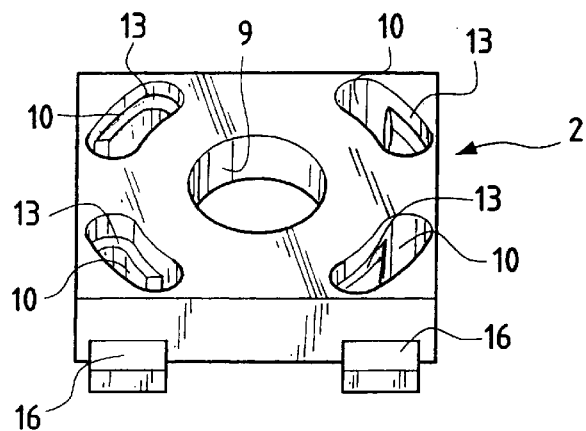
FIG.2
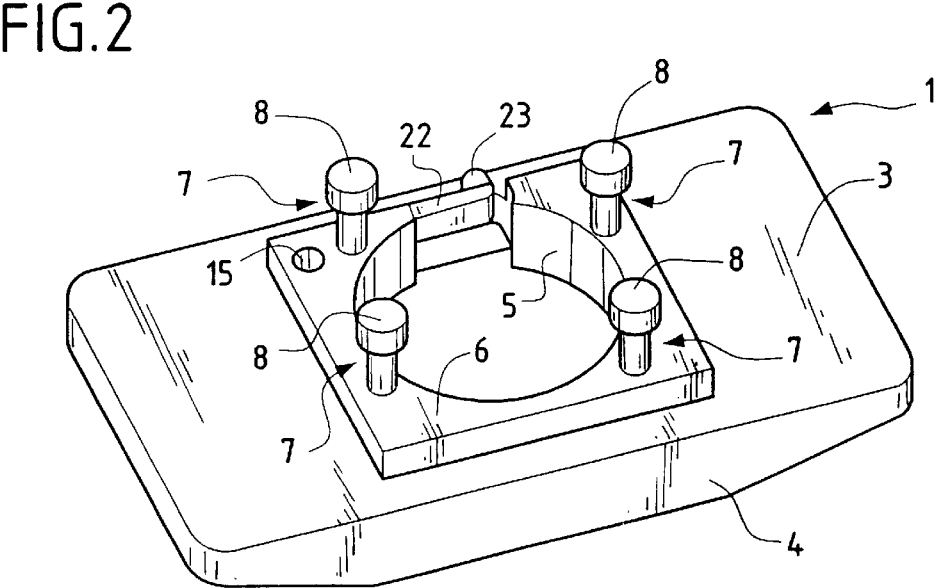

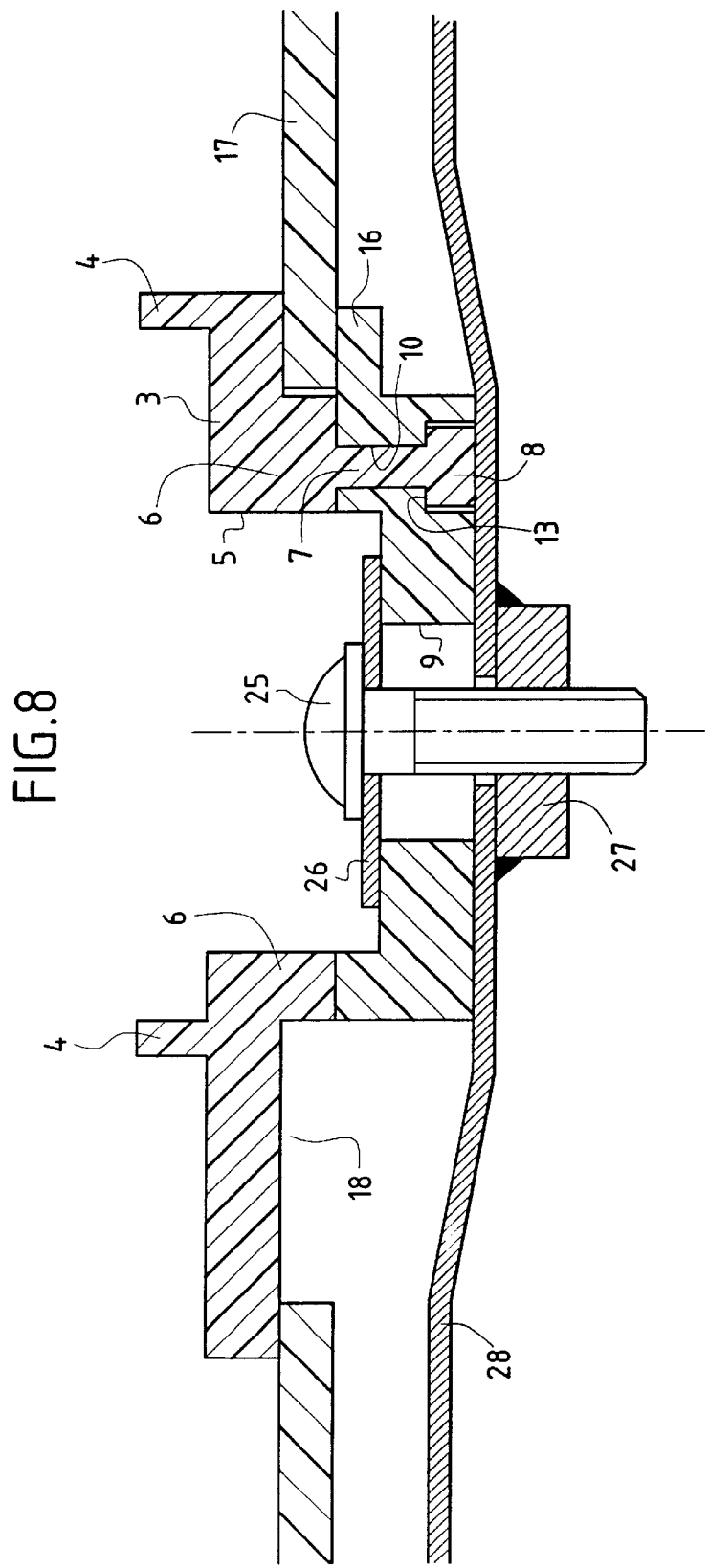

FRANGIBLE SLIDING FASTENING FOR FASTENING A PLASTICS MATERIAL PART ON A SUPPORT

The present invention relates to a fastening enabling a plastics material part to be secured in slidable manner to a support, said part nevertheless being capable of being detached from the support if a large force is applied.

BACKGROUND OF THE INVENTION

It is known that the expansion of bodywork parts made of plastics material gives rise to problems in the manufacture of vehicles because of painting and cataphoresis operations, and also in subsequent use because of post-shrinkage of the parts and because of the temperatures they can reach in the lifetime of the vehicle.

To resolve those problems, add-on fastenings are used that enable a bodywork part to slide relative to the structure of the vehicle. Such fastenings are referred to as "sliding fastenings".

French patent application No. 96/04317, published under the No. 2 747 091 describes such a sliding fastening.

Nevertheless, another problem arises with fastenings for plastics material parts, particularly with bodywork parts for motor vehicles.

In addition to their tendency to expand relative to their support, such parts break on being subjected to a certain level of force, such that when used as bodywork parts they are advantageous for impacts at small speeds because the flexibility of the plastics material enables them to withstand small deformations without damage, however they can give rise to problems both in terms of repair costs and in terms of safety when impacts are of greater energy since a piece of broken plastics material can constitute a sharp object that is particularly dangerous.

OBJECTS AND SUMMARY OF THE INVENTION

The present invention seeks to propose a novel sliding fastening which presents the conventional advantages of such a fastening, and indeed others which are explained below, and which eliminates the above-mentioned drawbacks associated with the high forces to which plastics material parts fastened in this way can be subjected, and in particular so as to reduce repair costs after an impact at 15 kilometers per hour (km/h).

The present invention provides a sliding fastening for a plastics material part having at least one thing wall that is to be slidably fastened to a support via its thin wall, the part including in said thin wall an elongate opening having two longitudinal edges that are substantially parallel at least over a portion of their length, the fastening comprising a spacer that is separate from the part, that is thicker than the thickness of the thin wall, and that is suitable for sliding in the opening between the two longitudinal edges thereof, a cover completely covering the spacer, being larger than the opening so as to be incapable of passing through it in order to hold the thin wall in register with the thickness of the spacer, and a base for securing to the support, wherein the spacer and the base are united by frangible links.

In the invention, the term "thin wall" is used to designate a portion of the part having one dimension that is very small compared with its other two dimensions.

The sliding fastening of the invention is preferably mounted on the part to be fastened, thereby enabling the part to be handled with the fastening preinstalled for fastening to-the vehicle.

The frangible links of the fastening enable it to release the plastics material part when they are subjected to a high level of force, for example during an accident if they are on a motor vehicle.

The bodywork part is thus preserved since it becomes detached from the vehicle instead of breaking, thereby achieving savings in terms of vehicle repair, and also protecting the people involved in the accident from any risk of being cut by a sharp object of the kind that can be constituted by a broken piece of bodywork. This applies in particular to plastics material fenders for motor vehicles.

In a particular embodiment of the invention, the spacer and the base are united by links that are not only frangible, but also releasable.

The first lies in the fact that manufacture of the plastics material for the spacer and the base is made easier, in particular with respect to the frangible links which would be difficult to calibrate accurately if the spacer and the base were molded as a single piece.

The second advantage lies in mounting the fastening on the thin wall of the part. Because the links are releasable, it is possible to present the spacer and the base on either side of the thin wall and to assemble them together by means of the releasable links, with the thin wall being held captive in the thickness of the spacer.

In a particular embodiment, the releasable links are constituted by pegs which engage in oblong openings and which are held therein by relative displacement between the spacer and the base.

The pegs can be on the spacer and the oblong openings in the base, or vice versa.

The relative displacement between the spacer and the base is preferably a pivoting movement about a central axis of the fastening that is perpendicular to the plane of the thin wall.

In a particular embodiment, the spacer and the base are prevented from moving relative to each other by complementary shapes snapping into engagement, for example a projection on the base in a recess of the spacer, or vice versa.

The surface areas of the spacer and the base that bear against the support are preferably large enough to prevent any creep of the fastening, even when its temperature rises.

These surface areas are selected as a function of the desired conditions and of the material used.

Appropriately selected bearing surface areas make it possible in particular to avoid using a lock-washer of the kind usually employed for ensuring that a screw is kept tight when the spacer is secured to the support by means of a screw.

In a particular embodiment, the base has tongues for holding the thin wall in the thickness of the spacer, between the base and the cover.

In embodiments in which the links between the spacer and the base are not releasable, one of the longitudinal edges of the opening has one or more slots of shape corresponding to that of the tongue(s) of the base, enabling the spacer to be put into place in the opening. In addition, asymmetrical tongues can be provided on each side of the base so that the slots of the opening allow the spacer to be inserted in a single orientation only, wherever the spacer needs to comply with a particular orientation.

In a particular embodiment of the invention, the spacer has an elastically deformable portion that bears slidably against the thin wall of the part while the spacer is sliding inside the opening, the thin wall having a coupling shape organized in such a manner that when the spacer is in a privileged position relative to the opening, the deformable portion of the spacer couples with the thin wall.

In other words, while the spacer is sliding in the opening, the elastically deformable portion snap-fastens in the coupling shape of the thin wall, thereby defining a hard point in the stroke of the spacer, corresponding to the privileged position for the spacer relative to the opening.

This privileged position is defined as being a prepositioning position for the spacer on the part, in order to facilitate assembling said part on its support.

For example, for a motor vehicle bodywork part, the privileged position of the spacer relative to the opening is such that the spacer can move inside the opening in a first direction to compensate post-shrinkage of the thermoplastic material, and in a second direction, opposite to the first, to compensate differential expansion between the thermoplastic material part and the structure of the vehicle.

Since expansion differences are preponderant, the stroke available to the spacer in the opening in the second direction is preferably greater than that made available to it in the first direction.

When one of the longitudinal edges of the opening has one or more slots for installing the spacer fitted with tongues in the opening, the position in which the spacer is placed in the opening is preferably at a distance from its privileged position.

In a preferred variant of this embodiment, the elastically deformable portion of the spacer is constituted by a resilient tab provided with an external bulge which bears against one of the longitudinal edges of the opening, the longitudinal edge in question having as its coupling shape a groove into which the bulge of the resilient tab engages when the spacer is occupying its privileged position relative to the opening.

In a preferred embodiment of the invention, said elastically deformable portion of the spacer is directly molded with the spacer, e.g. the resilient tab provided with a swelling is molded directly with the spacer.

BRIEF DESCRIPTION OF THE DRAWINGS

In order to make the invention better understood, there follows a description of an embodiment given by way of non-limiting example and with reference to the accompanying drawings, in which:

FIG. 2 is a view analogous to FIG. 1, but seen from beneath;

FIG. 8 is a section on VIII—VIII of FIG. 4.

MORE DETAILED DESCRIPTION

Figure 1:
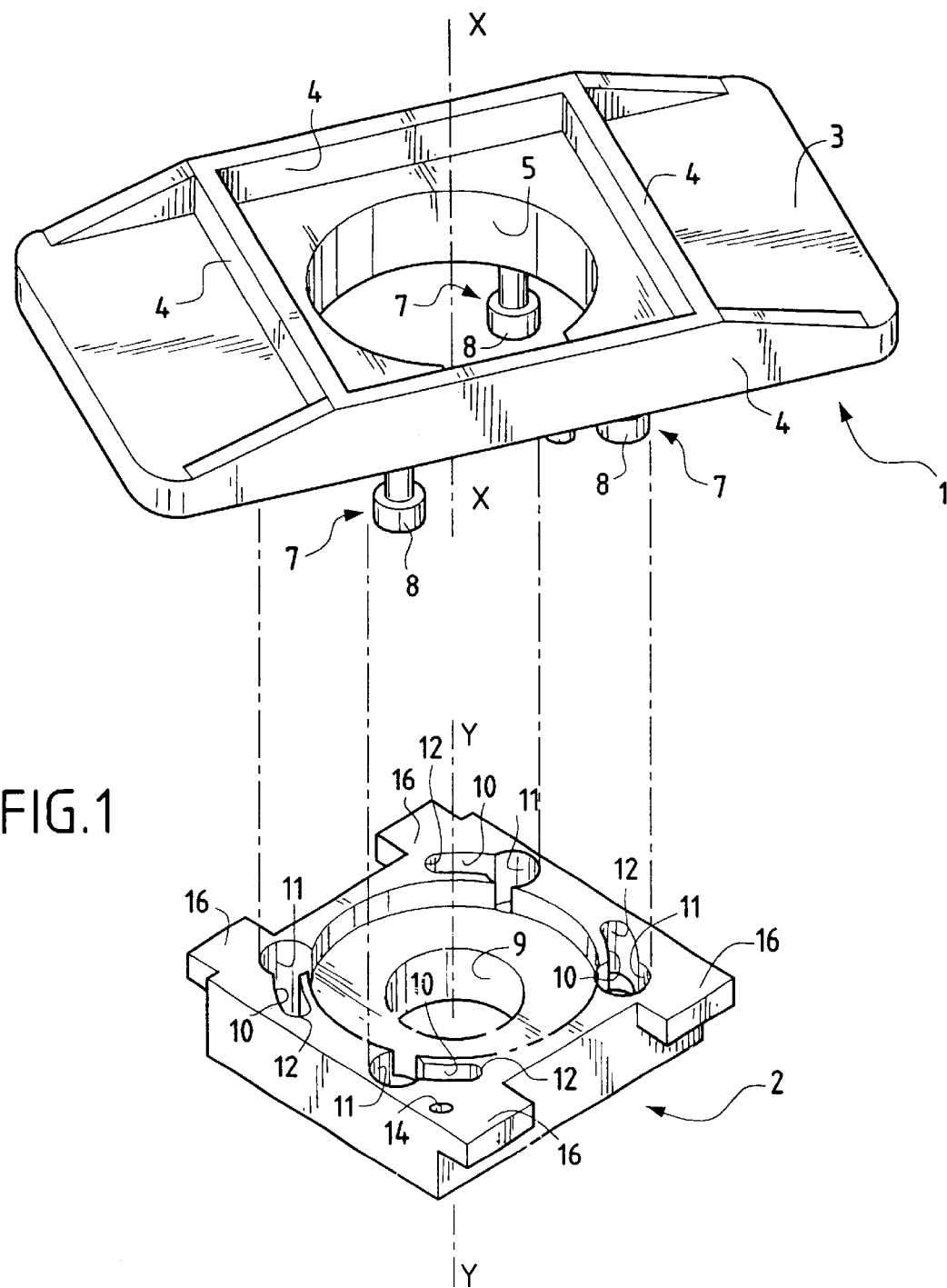
FIG. 1 is a perspective view of a two-part fastening constituting an embodiment of the invention and seen from above.

The fastening shown in the drawings comprises two portions 1 and 2 where the first portion 1 constitutes a cover and a spacer and the second portion 2 constitutes a base.

The cover is a rectangular plate 3 provided with reinforcing ribs 4 on its top face and having a central cylindrical passage 5 of large diameter passing through its thickness on an axis X—X.

The spacer 6 is a square parallelepiped centered to project from the bottom face of the cover 3. It too has the cylindrical opening 5 of large diameter passing therethrough.

Four pegs 7 are regularly distributed around this opening and they extend from the spacer 6 away from the cover 3. Each peg is terminated by an enlarged cylindrical head 8.

The base 2 is a square parallelepiped having the same cross-section as the spacer, with a cylindrical central opening 9 of small diameter on an axis Y—Y. When the base 2 is put into place against the spacer 6, the opening 9 of small diameter in the base and the opening 5 of large diameter in the spacer lie on the same axis.

The total thickness of the base 2 is substantially equal to the height of the pegs 7, including their heads 8.

The base 2 has four oblong openings 10, each designed to receive one of the pegs 7 of the spacer, these openings being positioned in the four corners of the large face of the base.

Each oblong opening 10 has a first end 11 forming a cylindrical through passage of diameter slightly greater than the diameter of the head 8 of a peg 7. The opening is extended to a second end 12 along an arc centered on the axis Y—Y and matching the profile of the peg, i.e. on the side of the base that is directed towards the spacer and over a thickness corresponding to the height of the peg between its head and the spacer 6, the width of the oblong opening is slightly greater than the diameter of the peg, while on the side remote from the spacer and over a thickness corresponding to the height of the head, the width of the oblong opening is slightly greater than the diameter of the head of the peg.

Thus, each oblong opening presents a shoulder 13 away from its first end, and as can be seen in FIG. 2.

The positions of the pegs 7 on the spacer are selected in such a manner that when the base is in alignment with the spacer, each peg 7 is in register with the second end 12 of an oblong opening 10.

Figure 3:
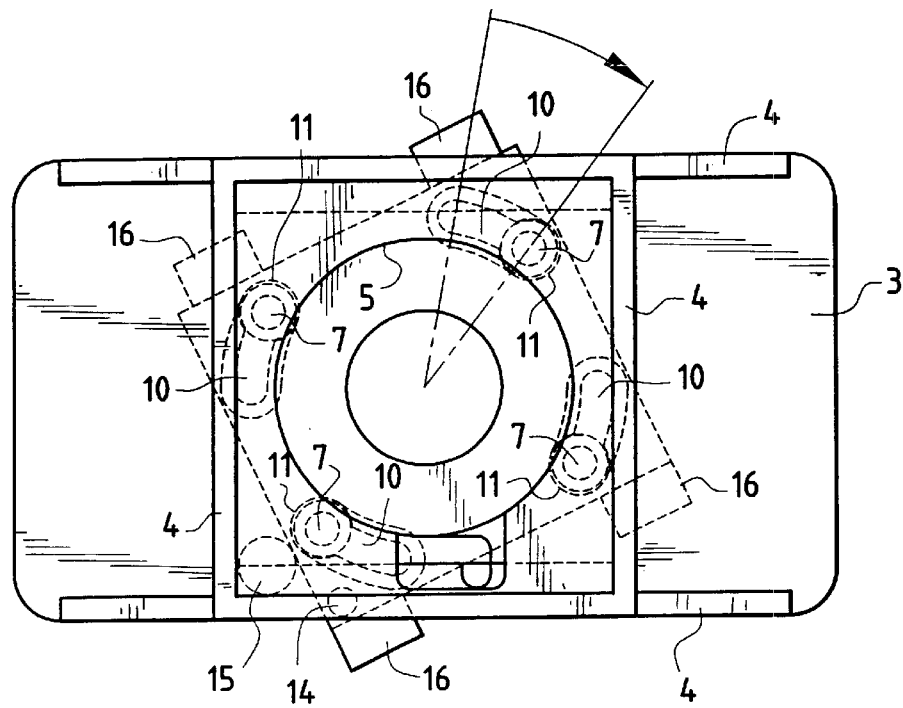
FIG. 3 is a view from above of the fastening prior to assembly of the spacer and the head.

It will be understood that the two portions of the fastening are assembled together by presenting the base to the spacer with an angular offset, as shown in FIG. 3, so that the pegs 7 are in register with the first ends 11 of the oblong openings 10.

The heads 8 of the pegs 7 are thus inserted into the oblong openings 10 and come flush with the face of the base that faces away from the spacer, the base thus coming into contact with the spacer.

Figure 4:
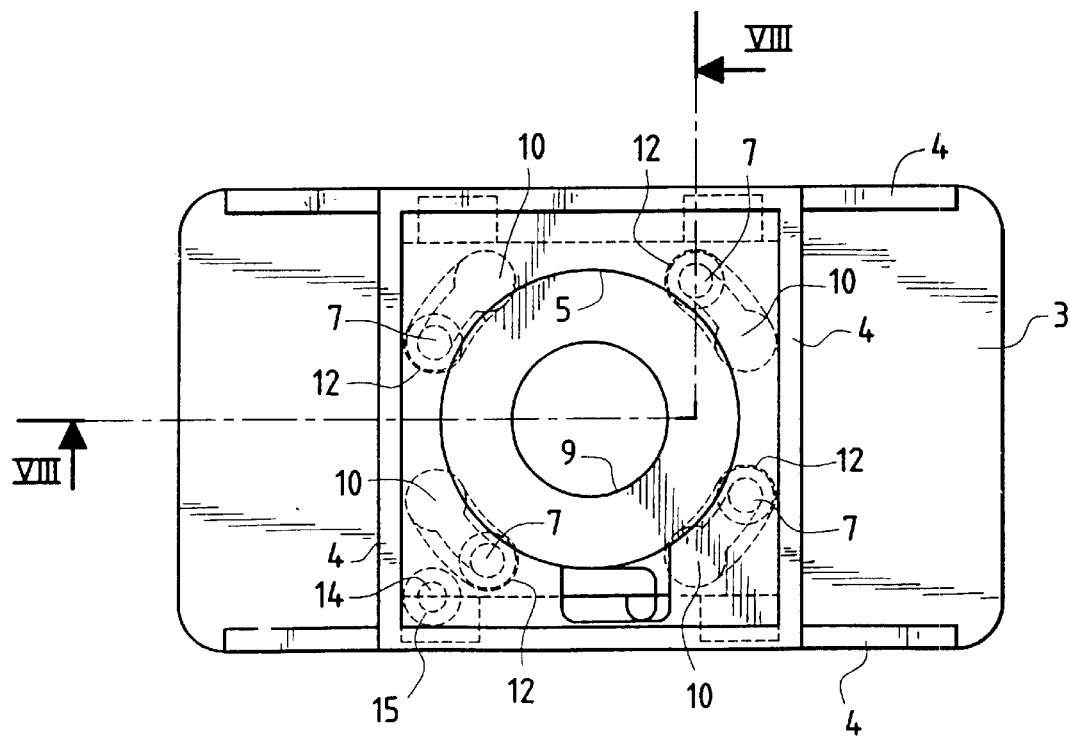
FIG. 4 is a view analogous to FIG. 3 after assembly.

Then by turning through an angle corresponding to that of the oblong openings, the base is pivoted on the spacer so as to bring it into the position shown in FIG. 4, in which position it extends the spacer, each peg 7 being held at the second end 12 of the corresponding oblong opening 10.

With the help of a spherical bulge 14 projecting from the base 2 and an orifice 15 passing through the spacer and situated in register with said bulge when the base and the spacer are in the assembled position, the two parts are snap-fastened relative to each other, thereby preventing the base from moving relative to the spacer.

Figure 5:
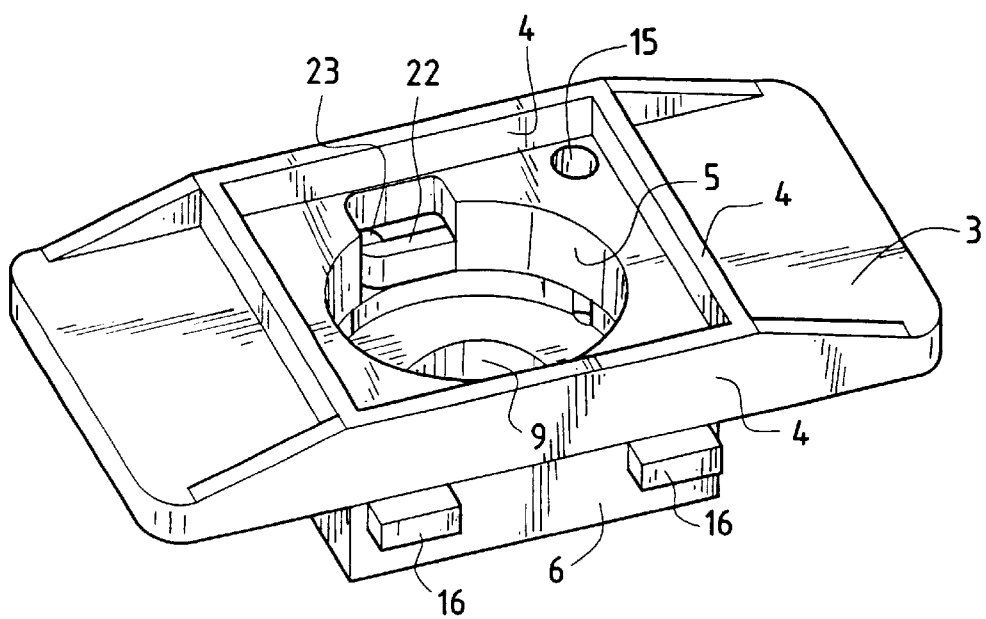
FIG. 5 is a perspective view of the assembled fastening.

This provides the assembled fastening shown in FIG. 5.

The base also has lateral tongues 16 which, when the base is assembled to the spacer, are to be found beside the longitudinal edges of the cover 3 and are flush with the face of the spacer remote from the cover so that a gap is left between said cover 3 and said tongues 16, with the thickness of the gap matching the thickness of the spacer 6.

Such tongues 16 are for holding captive the thin wall 17 of a plastics material part (shown in FIG. 6) in register with the thickness of the spacer 6, between the cover 3 and said tongues 16.

Figure 6:
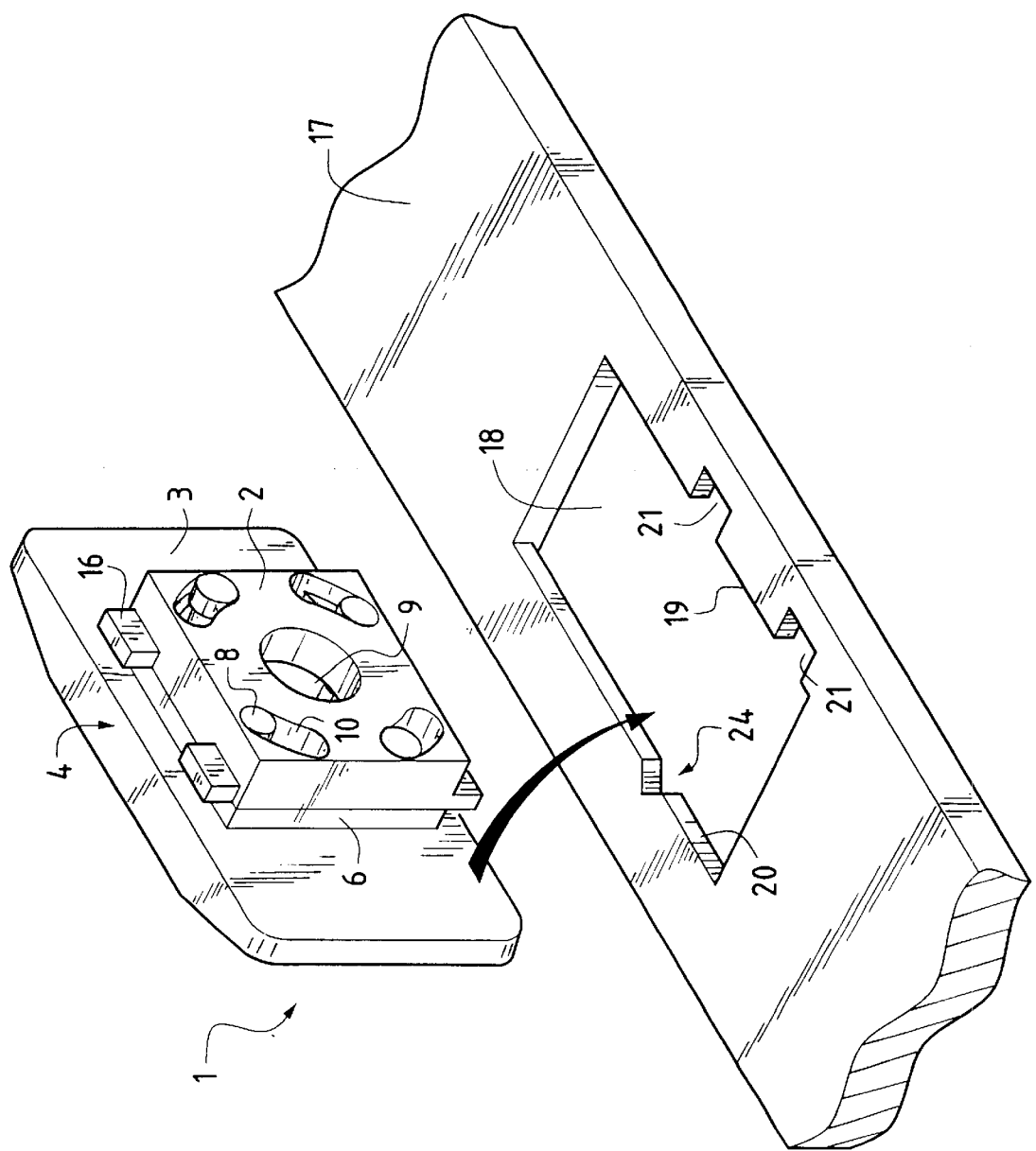
FIG. 6 is a perspective view of the assembled fastening immediately before it is put into place on a part that is to be fastened.

As can be seen in FIGS. 6 and 8, the thin wall 17 of the part to be fastened is provided with an elongate opening 18 of rectangular shape defined by two longitudinal edges 19 and 20 that are substantially parallel.

One of these two longitudinal edges, the edge 19, has two slots 21 corresponding to two fixing tongues 16.

The fastening is installed on the thin wall 17 by being presented in the position shown in FIG. 6, so that it engages the slot-free edge 20 of the opening 18 between the cover 3 and two fastening tongues 16, then pivoting the fastening about said edge 20 as represented by the arrow in FIG. 6 to bring the other two tongues 16 into the slots 21 in the opposite edge 19.

The tongues 16 thus pass under the thin wall 17 and the fastening can be slid so as to be positioned in the opening.

As can be seen more particularly in FIGS. 2 and 5, the spacer also has a resilient tab 22 provided with a bulge 23 which is integrally molded with the spacer 6 and the cover 3.

This resilient tab 22 bears against the slot-free edge 20 of the opening 18.

A groove 24 is formed in the thickness of the slot-free edge 20.

It will be understood that when the fastening slides in the opening, the bulge 23 of the resilient tab which bears against the edge 20 of the opening ends up by meeting the groove 24 and holds the fastening by snap-fastening in the opening.

The resilient tab thus prepositions the fastening relative to the part that is to be fixed, with the snap-fastening of the bulge in the groove nevertheless being easily overcome so as to allow the fastening to act as a sliding fastening.

Figure 7:
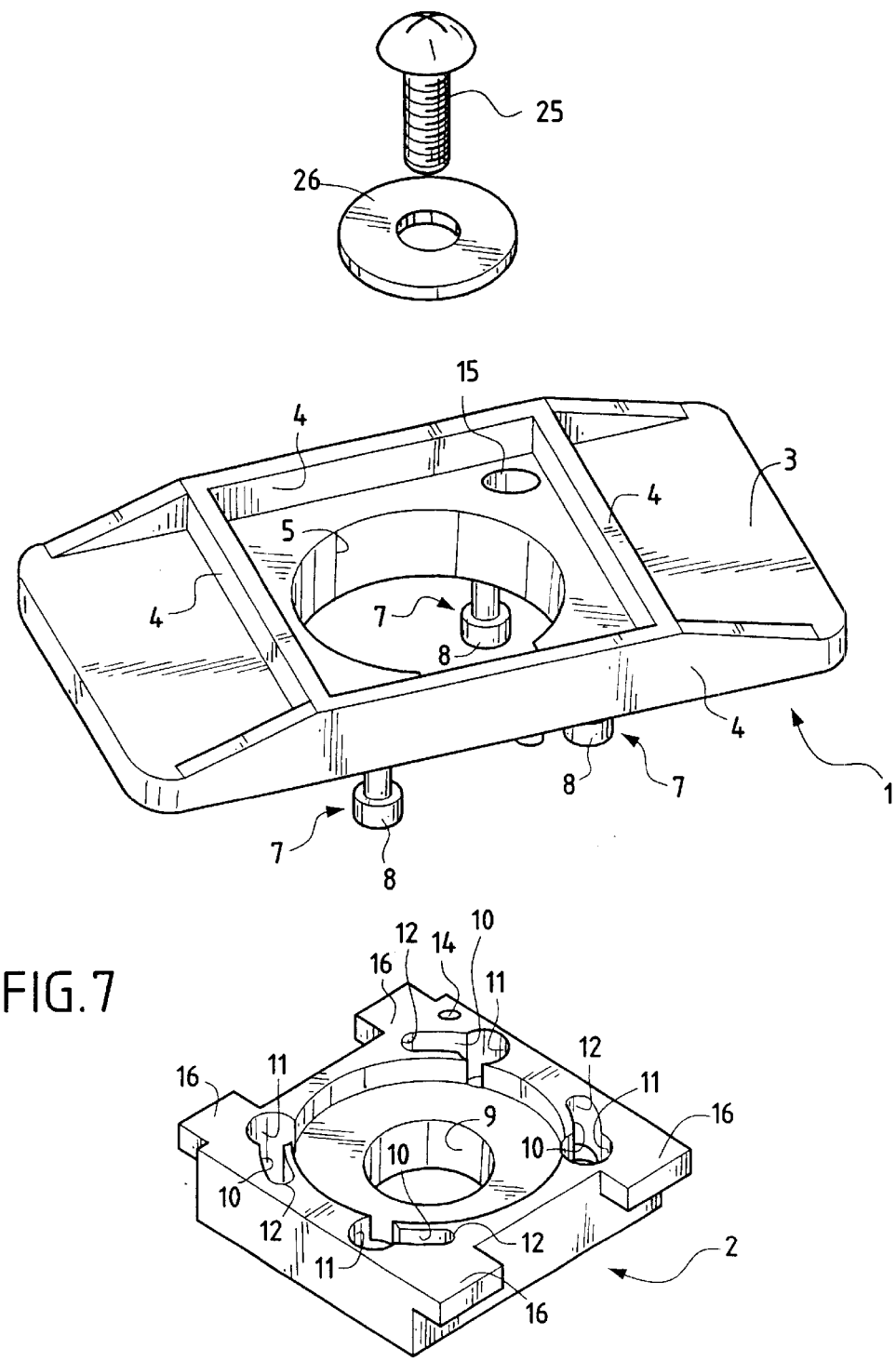
FIG. 7 is a view analogous to FIG. 1, showing a fastening screw and washer.

As can be seen in FIGS. 7 and 8, the fastening is secured to a support by means of a screw 25 and a washer 26. The outside diameter of the washer is smaller than the diameter of the cylindrical opening 5 in the cover and the spacer, but greater than the diameter of the cylindrical opening 9 in the base, such that when the screw 25 is tightened in a nut 27 secured to the support 28, it presses the washer against the base and it presses the base against the support.

In other words, the fastening is secured to the support via the base only. The spacer and the cover are held by the pegs 7.

These pegs which connect the base to the spacer are calibrated in such a manner as to break if the spacer is subjected to a large shear force relative to the base, i.e. a large force substantially parallel to the thin wall of the part to be fixed.

The same applies if the part is pulled off, with the force involved then being perpendicular to the thin wall and directed away from the support.

Consequently, if the part to be fixed is subjected to an impact tending to move it relative to the support, the pegs break and the fastening releases the part.

Naturally, the embodiment described above is not limiting in any way and could receive any desirable modification without thereby going beyond the ambit of the invention.

The principle of fixing the base by means of a screw could be replaced by that of snap-fastening. For that purpose, clips can be integrally molded with the base, the support being designed accordingly to receive them.

What is claimed is:

1. A sliding fastening configured to slidably fasten a plastics material part to a support, said part having at least one thin wall and, in said thin wall, at least one elongate opening, said opening having a maximum dimension, said sliding fastening comprising:

a spacer that is separate from said part and that slidably engages said elongate opening when the part is mounted on the sliding fastening, a cover attached to said spacer and having a dimension greater than the maximum dimension of said elongate opening, and a base separate from said spacer and not made integrally with said part, and capable of being secured to the support, wherein the spacer and the base are united by frangible links.

2. A fastening according to claim 1, wherein the frangible links are releasable.

3. A fastening according to claim 2, wherein the frangible and releasable links comprise pegs which engage in oblong openings and which are anchored therein by relative displacement between the spacer and the base.

4. A fastening according to claim 3, wherein the relative displacement between the spacer and the base is a pivoting movement about a central axis of the fastening.

5. A fastening according to claim 2, wherein the spacer and the base are configured to be prevented from moving relative to each other by snap-fastening.

6. A fastening according to claim 1, wherein the base has tongues for holding the thin wall in register with the thickness of the spacer between the base and the cover.

7. A fastening according to claim 1, wherein the spacer has an elastically deformable portion that bears slidably against the thin wall of the part while the spacer is sliding inside the elongate opening, the thin wall having a coupling shape configured in such a manner that when the spacer is in a predetermined position relative to the opening, the deformable portion of the spacer cooperates with the coupling shape of the thin wall.

8. A fastening according to claim 7, said elongate opening having two edges that are substantially parallel at least over a portion of their length wherein the elastically deformable portion of the spacer comprises a resilient tab provided with an external bulge which bears against one of the longitudinal edges of the opening, said longitudinal edge having a groove into which the bulge of the resilient tab engages when the spacer is occupying said predetermined position relative to the opening.

9. A fastening according to claim 7, wherein said elastically deformable portion of the spacer is directly molded with the spacer.

10. A fastening according to claim 1, the thin wall having a thickness, wherein the spacer has a thickness greater than the thickness of the thin wall.

11. A fastening according to claim 1, wherein the cover has a face on which the spacer protrudes, said face covering entirely the spacer.

12. A fastening according to claim 1, wherein said elongate opening has two edges that are substantially parallel at least over a portion of their length.

13. A sliding fastening configured to slidably fasten a plastics material part to a support, said part having at least one thin wall and, in said thin wall, at least one elongate opening, said opening having a maximum dimension, said sliding fastening comprising:

a spacer that is separate from said part and that slidably engages said elongate opening when the part is mounted on the sliding fastening, a cover attached to said spacer and having a dimension greater than the maximum dimension of said elongate opening, and a base separate from said part and said spacer, and capable of being secured to the support, wherein the spacer and the base are united by pegs which engage in oblong openings and which are anchored therein by relative displacement between the spacer and the base.

* * * * *